(12) United States Patent
Bahder (10) Patent No.: US 7,359,064 B1
(45) Date of Patent: Apr. 15, 2008

(54) QUANTUM POSITIONING SYSTEMS AND METHODS

(75) Inventor: Thomas B. Bahder, Clarksville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 61 days.

(21) Appl. No.: 11/155,924

(22) Filed: Jun. 17, 2005

(51) Int. Cl.
*G01B 9/02* (2006.01)

(52) U.S. Cl. .................................... 356/496

(58) Field of Classification Search ............... 356/4.09, 356/496, 498
See application file for complete search history.

(56) References Cited

OTHER PUBLICATIONS

Giovannetti et al, Quantun-enhanced positioning and clock synchronization, Nature, vol. 412, Jul. 2001, pp. 417-419.*
Bahder et al, Clock Synchronization Based on Second-order Coherence of Entangled-Photons, proceeding-7th Internation Conference on Quantum Communications, Jul. 2004.*

* cited by examiner

*Primary Examiner*—Samuel A. Turner
(74) *Attorney, Agent, or Firm*—Edward L. Stolarun; A. David Spevack (57) ABSTRACT

Included in this disclosure is a quantum positioning system (QPS) that includes a corner cube reflector and a plurality of baselines. Each baseline may include an interferometer, which may include a photon source, a beam splitter, and a photon detector. The interferometer is configured for creating a bi-photon pair and initiating communication of the bi-photon pair with the corner cube reflector. Also included in the QPS is a positioning device configured to calculate a user's position.

13 Claims, 8 Drawing Sheets

QUANTUM POSITIONING SYSTEMS AND METHODS

GOVERNMENT INTEREST

The invention described herein may be manufactured, used, and licensed by or for the United States Government.

TECHNICAL FIELD

The disclosure relates to particle system analysis. More specifically, the disclosure relates to systems and methods for quantum positioning.

DESCRIPTION OF THE RELATED ART

During the past several years, the Global Positioning System (GPS) has practically become a household word. The GPS is a U.S. Department of Defense satellite system that is used by both the military and civilians for navigation and time dissemination. Automobile, ship, aircraft, and spacecraft use the GPS for navigation. Telephone and computer network systems that require precise time measurement use the GPS for time synchronization. The GPS is a complex system comprising approximately 24 satellites orbiting the Earth in circular orbits at approximately 4.25 Earth radii. The GPS is designed so that signals travel line-of-site from a satellite to a user. From any place on Earth, at least four satellites are in view. If a user receives four GPS satellite signals simultaneously from four satellites, s=1, 2, 3, 4, and the satellites' space-time coordinates $(t_s, r_s)$ at time of transmission are known, the user can determine this unknown space-time coordinates, $(t_0, r_0)$ by solving the four equations:

$$|r_0-r_s|^2-c^2(t_0-t_s)^2=0, \text{ where } s=1,\ldots 4 \quad (1)$$

In Equation (1) atmospheric delays are ignored and it is assumed that the signals travel on four light cones that are centered at the reception event. The actual signals that the GPS satellites transmit are generally continuous-wave, circularly polarized, radio-frequency signals on two-carrier frequencies in the L-band centered about $L_1 \approx 11575.24$ MHz and $L_2 \approx 1227.6$ MHz. The carrier frequency signals can be modulated by a pseudorandom noise (PRN) code. A GPS receiver makes a phase-difference measurement, called a pseudorange measurement, which is the phase difference between the PRN code received from the satellite and an identical copy of the PRN code that is replicated inside the GPS receiver. The pseudorange measurement is essentially made by performing a correlation of the code bits in the PRN code received from the satellite with an identical copy of the same PRN code replicated inside the GPS receiver.

Recently, there have been several proposals for synchronizing clocks by making use of entangled quantum systems. The question naturally arises whether entangled quantum systems can be exploited to determine all four space-time coordinates of a user, rather than just time.

More fundamentally, and more significant for applications, is that in the classical case of a time of arrival (TOA) system, one must have good clocks that are synchronized to coordinate time so that accurate pulse arrival times at the four $R_i$ reception points can be recorded. A good clock that keeps coordinate time is often a difficult requirement to meet in practice.

In addition, in the case of the GPS, if a user does not know his coordinate time, then he must observe signals from four satellites, even if he only wants to determine his spatial coordinates. Further, the GPS is a one-way signal travel system. Finally, the GPS classical information (comprising the emission event time at the satellite) is carried in the PRN code bit numbers broadcast by the GPS satellites.

Thus, a heretofore unaddressed need exists in the industry to address the aforementioned deficiencies and inadequacies.

SUMMARY

One embodiment discussed in this disclosure is a quantum positioning system (QPS) that includes a corner cube reflector and a plurality of baselines. Each baseline may include an interferometer, which may include a photon source, a beam splitter, and a photon detector. The interferometer is configured for creating a bi-photon pair and initiating communication of the bi-photon pair with the corner cube reflector. Also included in the QPS is a positioning device configured to calculate a user's position.

This disclosure also discusses an embodiment that includes a method for determining a user's position that includes creating at least one bi-photon pair in an interferometer, directing each photon of the at least one bi-photon pair in a different direction along a baseline, redirecting each photon of the at least one bi-photon pair to a corner cube reflector, and receiving each photon of the at least one redirected bi-photon pair from the corner cube reflector.

Additionally, this disclosure discusses an embodiment that includes a device for calculating a user's position. The device includes an interferometer for creating a bi-photon pair and receiving photons from a corner cube reflector. The interferometer includes a photon source, a beam splitter, and a photon detector. Also included with the device is a baseline configured to facilitate communication of photons between the device and the corner cube reflector, and a position calculator, configured for calculating a user's position from data received from the created photons.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 9 is a two-dimensional plot illustrating the position error $R_{xyz}$ versus $x_0$ for $$y_0 = z_0 = \frac{R_e}{\sqrt{3}}$$

in at least one embodiment of a QPS.

FIG. 10 illustrates a plot of the position error in the radial direction: $R_{xyz}$ $$\left(\frac{r_0}{\sqrt{3}}, \frac{r_0}{\sqrt{3}}, \frac{r_0}{\sqrt{3}}\right)$$

versus $r_o$ for the same parameters.

DETAILED DESCRIPTION

Described herein is a quantum positioning system (QPS) capable of providing a user with all four space-time coordinates. The QPS is based on entangled photon pairs (biphotons) and second-order correlations within each pair. The two-photon coincidence counting rate is the basic measured quantity. In one embodiment, a user of the QPS may carry a corner cube reflector and a clock, and can have the capability for two-way classical channel communication with the origin of the reference frame.

Also included in this disclosure is interferometric quantum positioning system (QPS) based on second order quantum coherence of entangled photon pairs (biphotons). A user's spatial coordinates can be determined by locating three unique minima in three different two-photon counting rates. The three unique minima are typically associated with three HOM (Hong-Ou-Mandel) interferometers built on independent baselines. Note however that depending on the relative phase of the photons, the minimum in photon counting rate may actually be made to be a maximum. Such an embodiment may be preferable for reasons of signal-to-noise in the system. The spatial portion of the QPS is similar to a classical Time of Arrival (TOA) system. However, a classical TOA system requires synchronized clocks that keep coordinate time, which is often a difficult requirement to meet. In contrast, the QPS includes a clock having a short-term stability to measure two-photon coincidence counting rates while the optical time delay is adjusted (to locate the minima in the two-photon coincidence counting rate $R_c$). Bright sources of entangled photons (biphotons) may also be used.

Several different scenarios are considered for a QPS. One example is a terrestrial system and another is satellite-based system. In both cases, the accuracy of a user's position may be represented as a function of user position. The function that describes the errors in position has a complex spatial dependence.

Figure 1:
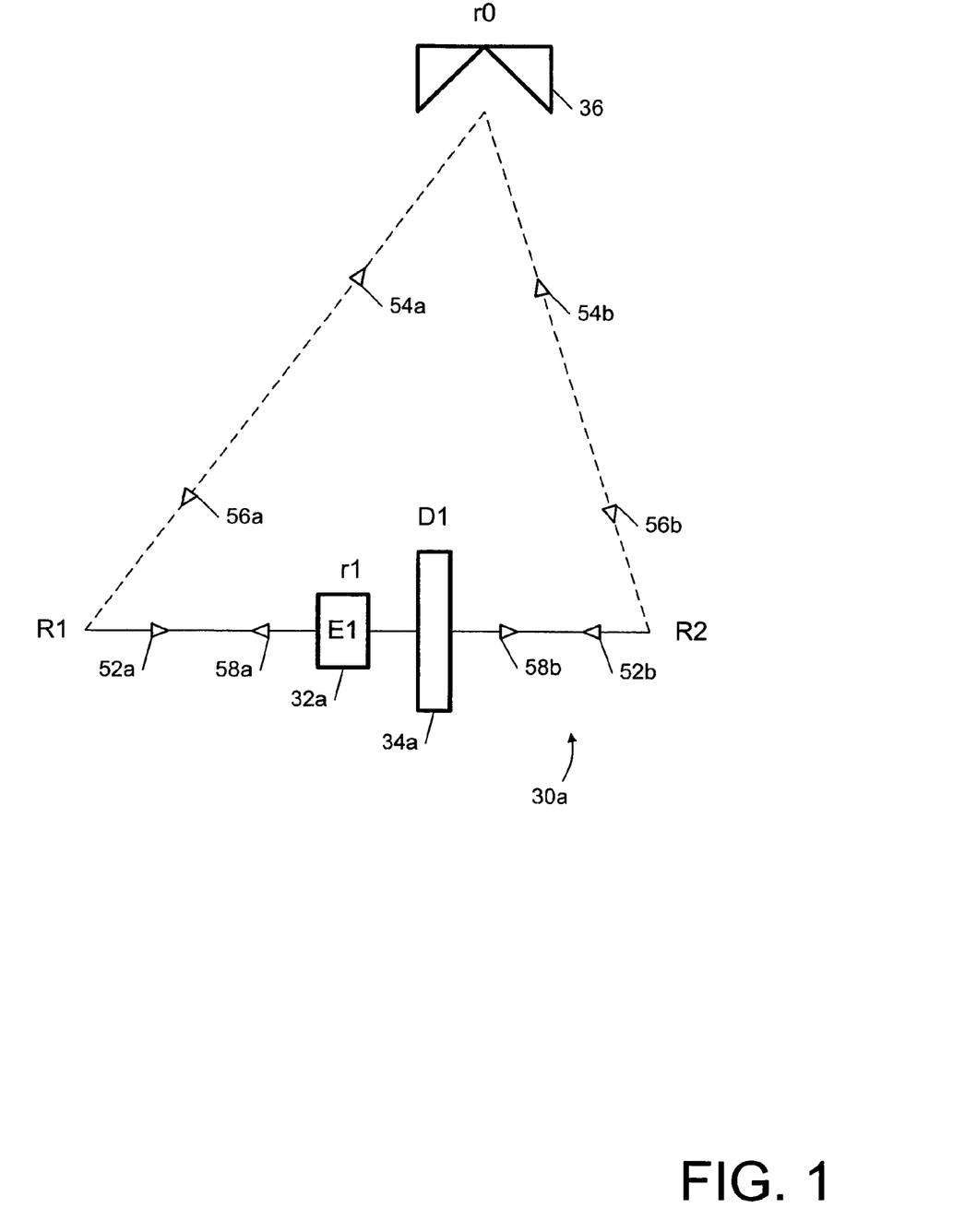
FIG. 1 is a functional block diagram of an embodiment of a baseline 30a for a Quantum Position System (QPS).

FIG. 1 is a functional block diagram of an embodiment of a baseline 30*a* for a QPS. For simplicity of discussion, it is assumed that space-time is flat with Minkowski coordinates (t, x, y, z) and that a user of the QPS is stationary. As illustrated in FIG. 1, spatial points R1 and R2 define baseline 30*a*. Along the baseline 30*a*, the QPS may include an interferometer 32*a*. The interferometer 32*a* may include a biphoton source 42 (see FIG. 2) to create entangled photon pairs. Additionally, the interferometer 32*a* may include a beam splitter 44 and may take the form of a two-photon coincidence counting Hong-Ou-Mandel (HOM) interferometer (also see FIG. 2). There will generally be a plurality of baselines in each QPS system communicating with a corner cube reflector 36. Additionally, each baseline will have an interferometer 32. In this nonlimiting example, the QPS will include three baselines 30*a*, 30*b*, and 30*c* (see FIG. 3) with corresponding functions and components.

Figure 3:
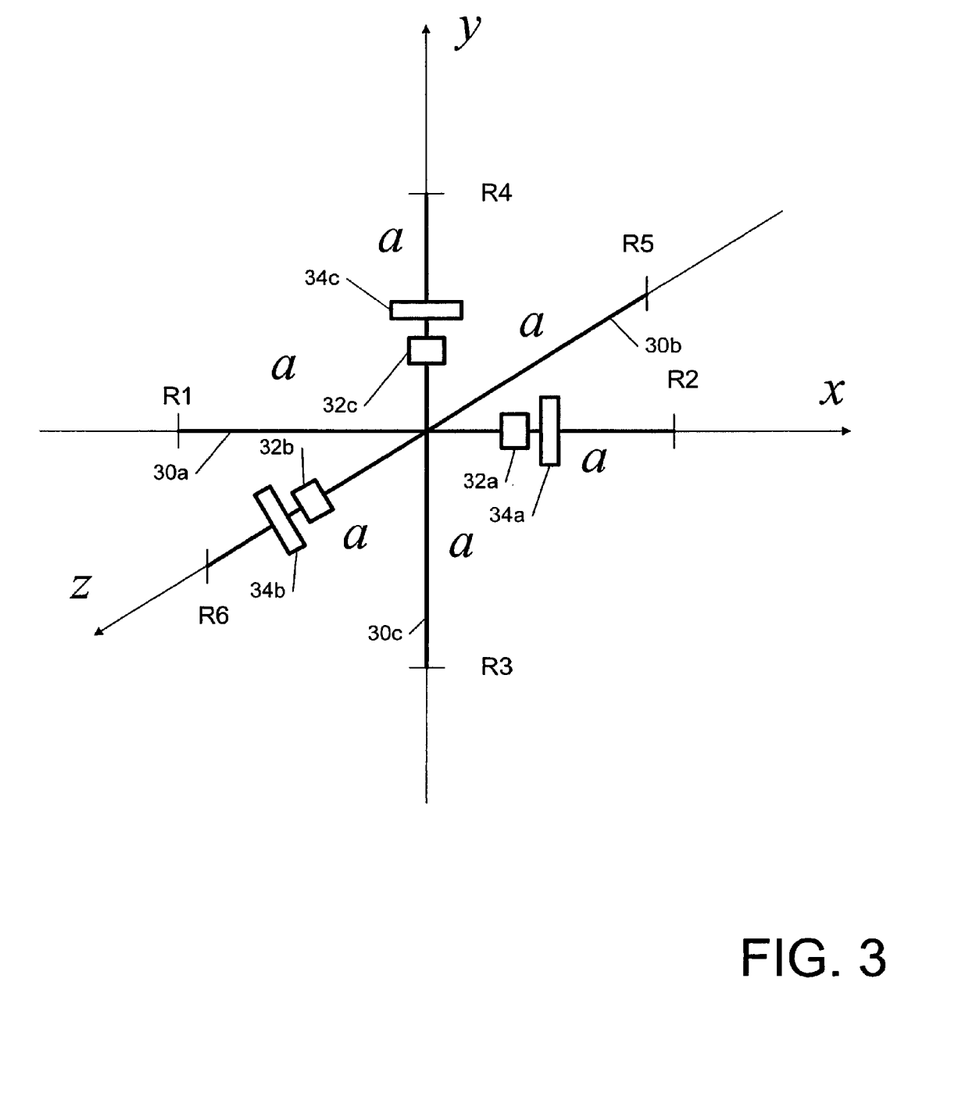
FIG. 3 is a three-dimensional diagram of Cartesian coordinates illustrating a few possible positions for baselines 30a, 30b, and 30c, in three-dimensional space.

In addition to interferometer 32*a*, 32*b*, and 32*c* (see also FIG. 3), each baseline also includes an adjustable optical delay 34*a*, 34*b*, and 34*c* (see also FIG. 3). As is evident in FIG. 1, one embodiment may include three baselines 30*a*, 30*b*, and 30*c* to determine each of the three coordinates (x, y, z) that define the user's position.

Each baseline, such as baseline 30*a*, which connects points, ($R_1$, $R_2$), corresponds to an entangled photon pair (biphoton) source located in the baseline 30*a* (in interferometer 32*a*). In the nonlimiting example of FIG. 1, the biphoton source is taken to be at the approximate midpoint of the baseline at position $r_1$. However, the biphoton source could reside at any point along the baseline 30*a*. Additionally the baseline 30*a* can also include an adjustable optical delay at point $D_1$.

Figure 2:
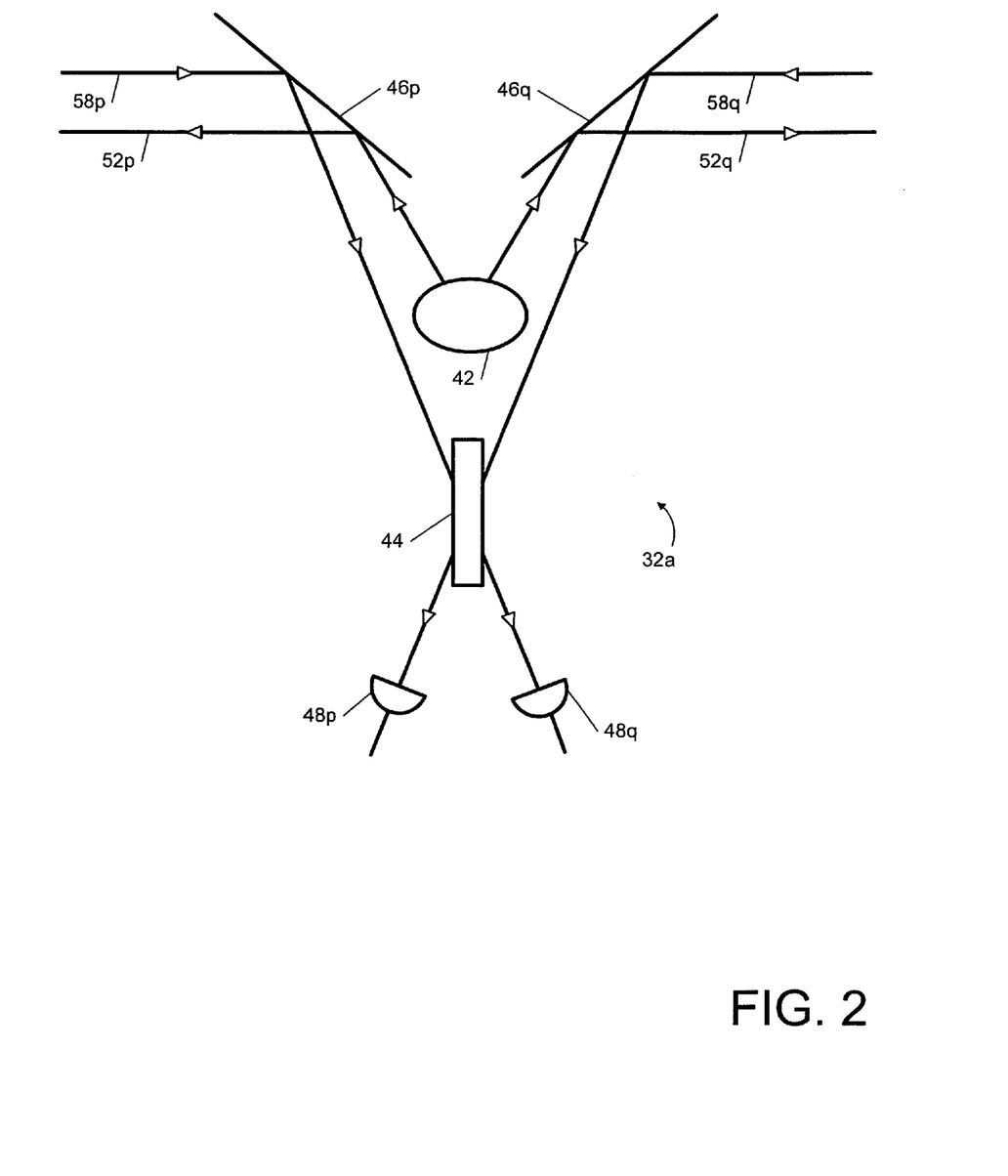
FIG. 2 is a functional block diagram of an embodiment of an interferometer 32a shown in FIG. 1.

FIG. 2 is a functional block diagram of an embodiment of the interferometer 32*a* from FIG. 1. Photon pairs are created in photon source 42. The photons are reflected off of mirrors 46*p* and 46*q*, and are sent to positions $R_1$ and $R_2$ (from FIG. 1), as indicated by emission lines 52*p* and 52*q*. The photon pairs are received at $R_1$ and $R_2$ and are re-directed to the user at the unknown position $r_0$ (see FIG. 1) along reflected emission lines 54*a* and 54*b*. The two photon paths are similar, except that one path (in this nonlimiting example the lines denoted as 52*q*, 54*b*, 56*b*, and 58*q*) has a controllable optical delay 34*a*, denoted $D_1$ (see FIG. 1). The optical delay 34*a* is assumed to be calibrated so that one can accurately impose an arbitrary delay time.

The entangled photons reflect from the corner cube reflector 36 at $r_0$ (FIG. 1), and return back through points $R_1$ and $R_2$ along return lines 56*a* and 56*b*. At those points, the photons are reflected along return lines 58*p* and 58*q*. The photons then arrive at an interferometer 32*a*. For convenience, it is assumed that the interferometer 32*a* is collocated with the photon generation point $r_1$. Again, both photon return paths are similar, but one path has the optical delay $D_1$ (in this nonlimiting example along lines 52*q*, 54*q*, 56*q* and 58*q*). This difference yields the following effective round-trip times for each photon:

$$t_L = \frac{2}{c}[|r_0 - R_1| + |R_1 - r_1|] \tag{2a}$$

$$t_R = \frac{2}{c}[|r_0 - R_2| + |r_1 - R_2| + (n-1)d] \tag{2b}$$

where d is the geometric thickness of the optical delay $D_1$ (item 34*a*, FIG. 1) perpendicular to the optical path and n is the effective index of refraction for the optical delay $D_1$. The optical delay $D_1$ can be adjusted until a minimum two-photon counting rate is observed at $E_1$, the interferometer 32*a*. When the minimum is observed at interferometer 32*a*, the effective travel times for each photon path are equal, i.e., $t_L = t_R$. The interferometer 32*a* is balanced when the condition $t_L=t_R$ is satisfied, and a unique minimum is observed in the two-photon counting rate $R_c$. The accuracy with which this minimum can be observed depends on the bandwidth $\Delta w$ of band-pass interference filters (not shown), which may be used in front of the photon detectors 48p, 48q from FIG. 2.

An equation that relates the geometric path lengths to the measured optical delay time $\Delta t_1=(n-1)d/c$ can be represented as the following:

$$|r_0-R_1|+|R_1-r_1|=|r_0-R_2|+|r_1-R_2|+c\Delta t_1 \quad (3)$$

An analogous measurement process is carried out for the other two baselines 30b, 30c (see FIG. 3). For simplicity, it can be assumed that the points $E_1$, $E_2$, and $E_3$ (where $E_1$ and $E_2$ represent interferometers for the other two baselines 30b and 30c and correspond to elements 32b and 32c, respectively) are located at midpoints of their baselines. From this information, three equations are obtained:

$$|r_0-R_1|=|r_0-R_2|+s_1 \quad (4)$$

$$|r_0-R_3|=|r_0-R_4|+s_2 \quad (5)$$

$$|r_0-R_5|=|r_0-R_6|+s_3 \quad (6)$$

The two-photon coincidence counting rate can be represented in Equation 7:

$$R_c=\alpha_1\alpha_2|\eta V|^2|G(0)|^2[1-e^{-(\Delta\omega\Delta t_1)^2}] \quad (7)$$

where $|V|^2$ is the pump intensity in photons per second and, $\alpha_1$ and $\alpha_2$ are the quantum efficiencies of detectors $D_1$ and $D_2$. $\eta$ is a dimensionless constant and $G(t)$ is the Fourier transform of the spectral function $\phi$, which is the autocorrelation function of the down-converted light where:

$$G(t)=\int_0^\infty \phi\left(\frac{1}{2}\omega_0+\omega, \frac{1}{2}\omega_0-\omega\right)e^{-i\omega t}\,d\omega \quad (8)$$

Equations (4)-(6) can be solved for the three unknown user spatial coordinates, $r_0=(x_0, y_0, z_0)$, of the user's position in terms of the three measured time delays, $\Delta t_1$, $\Delta t_2$, $\Delta t_3$, which balance the three interferometers corresponding to each of the three baselines. The measured data includes photon coincidence count rate versus optical time delay lengths $s_i$, for i=1, 2, 3. A search can be implemented to locate a minimum that corresponds to equal time of travel along the interferometer arms. The computations can be made at points $E_1$, $E_2$, and $E_3$ corresponding to elements 32a, 32b, and 32c from FIG. 3. This search to locate a minimum is the quantum analog of the correlation of the PRN code in a classical GPS receiver, as described above. When the three interferometers at $E_1$, $E_2$, and $E_3$ are balanced simultaneously, a classical message is sent to the user giving him the values of his coordinates $r_0=(x_0, y_0, z_0)$. Clearly, classical communication can be utilized between the points $r_1$, $r_2$, and $r_3$ (which represent the position of each interferometer 32a, 32b, and 32c for each baseline 30a, 30b, and 30c, respectively) to establish that the interferometers are balanced at a given coordinate time t. One can imagine that when each interferometer is balanced, a message can be sent to the origin of coordinates.

When three messages are simultaneously received at the origin of coordinates (indicating that each of the three interferometers, each located on a baseline, are balanced), Equations (4)-(6) can be solved for the user's coordinates $r_0=(x_0, y_0, z_0)$, and the user's coordinates are sent to the user through a classical channel of communication.

In the QPS, there can be an apparent asymmetry in the determination of a user's spatial coordinates, $r_0=(x_0, y_0, z_0)$, and in the determination of the user's time. This asymmetry can be seen as a reflection of the asymmetric manner in which space and time enter in the theory of the quantized electromagnetic field to give rise to photons as quanta of the field. As mentioned above, the time synchronization of the user's clock to coordinate time can be completed using a method described in "Clock Synchronization Based on Second-order Coherence of Entangled Photons" by Bahder and Golding, published in proceedings of The Seventh International Conference on Quantum Communication, Measurement and Computing, Glasgow, United Kingdom, 25-29 Jul. 2004, which is hereby incorporated by reference in its entirety.

Six spatial points, $R_i$, where $R_i=(x_i, y_i, z_i)$ for i=1, 2, 3, . . . 6, define the spatial part of the reference frame at constant coordinate time t. The six points $R_i$ define three independent baselines in pairs $(R_1, R_2)$; $(R_3, R_4)$, and $(R_5, R_6)$. The points $R_i$ are assumed to be accurately surveyed, so their coordinates are precisely known. Determination of a user's spatial coordinates, $r_0=(x_0, y_0, z_0)$, is completed with respect to this reference frame. A stationary clock in this reference frame, for example at the origin of coordinates, (x, y, z)=(0,0,0), provides a measure of coordinate time t in this four-dimensional system of coordinates. These computations neglect gravitational effects so that the user's clock runs at the same rate as coordinate time t in the reference frame defined by the spatial points $R_i$, so that $d\tau/dt=1$. Synchronization of the user's clock to coordinate time provides a method to compute the integration constant $\tau_o$ in $\tau-\tau_o=t$. In four-dimensional flat space-time, the world lines of the spatial points $R_i$ define a tube. Events that are simultaneous in this system of four-dimensional coordinates occur at constant values of coordinate time t, and the events define a hyperplane that cuts this tube.

There are several possible modes for the QPS. First, one can consider a situation in which a user that desires to determine all four of his or her space-time coordinates ($t_0$, $x_0$, $y_0$, $z_0$). In "Clock Synchronization Based on Second-order Coherence of Entangled Photons," Bahder and Golding provide an algorithm to synchronize the proper time $\tau$ on a user's clock to coordinate time, t, without prior knowledge of the geometric range from the reference clock, which keeps coordinate time t, to the user clock. It is assumed that this algorithm is employed here to synchronize the user's clock with coordinate time t. This algorithm may employ a two-way classical channel of communication between the user and the reference frame origin, where coordinate time t is kept.

With some modification of the above scheme, one can imagine a similar system based on first-order coherence for position determination. A single beam from a continuous-wave laser can be split and the beams sent on two different paths. However, in such a case there is an ambiguity associated with the wavelength of the light that is unresolvable in principle. More specifically, interference fringes will be created. In contrast, QPS, which can utilize second-order coherence, resolves this ambiguity because equal propagation times for two paths lead to quantum interference. More specifically, equal travel times for two paths create a unique observable minimum in the two-photon coincidence counting rate $R_c$.

The measured quantities in the QPS are the optical path delays $s_i$. For a given measured value of optical delay, say $s_1$, Equation (4) indicates that the user's coordinates can lie on a hyperboloid surface with foci at $R_1$ and $R_2$. The user's position, $r_0$, is then given by the intersection of three hyperboloids given by Equations (4)-(6). Each equation represents the equation for a baseline in a classical TOA system that records arrival times of classical light pulses (or distinct intensity edges) at two spatial reception points $R_i$. In the case of a classical TOA system, pulse arrival time at four locations is needed to determine all four space-time coordinates. In that case, four time difference of arrival (TDOA) equations can be formed from four points, and each point is used to form the baselines. In particular, taking TDOAs results in a system of three equations where the emission event time has canceled out. In the quantum case, since correlations between photon pairs are used, three baselines defined by six points $R_i$ may be used, as can an additional interferometer for the determination of the user's time.

Geometric Dilution of Precision

In the case of the classical GPS, the geometrical positions of the GPS satellites determine the accuracy of the user's position. This effect is sometimes called the geometric dilution of precision (GDOP). One can compute the positioning accuracy and the effect of GDOP for the QPS from Equations (4)-(6). These equations give an implicit relation $r_0 = r_0(R_1, R_2, R_3, R_4, R_5, R_6, s_1, s_2, s_3)$ for the user position $r_0$ as a function of the three measured path delays, $s_i$, and the six baseline endpoints $R_i$. If the error in the measured path length delays, $ds_1$, $ds_2$, and $ds_3$, is known, one can compute the error in the three components of the user's position vector, $dr_0 = (dx_0, dy_0, dz_0,)$, from the following:

$$dr_0 = \sum_{i=1}^{3} \frac{\partial r_0}{\partial s_i} ds_i \qquad (9)$$

For constant $R_i$. However, these errors are statistical in nature, so one may instead compute the standard deviations $\sigma_x$, $\sigma_y$, and $\sigma_z$, of the user coordinates $x_0$, $y_0$, and $z_0$ as a function of the standard deviations $\sigma_{s1}$, $\sigma_{s2}$, and $\sigma_{s3}$, of the measured optical time delays $s_1$, $s_2$, and $s_3$. For constant $R_k$ for $k=1, \ldots, 6$, these standard deviations are related by the following:

$$\sigma_x^2 = \left(\frac{\partial x_0}{\partial s_1}\right)^2 \sigma_{s1}^2 + \left(\frac{\partial x_0}{\partial s_2}\right)^2 \sigma_{s2}^2 + \left(\frac{\partial x_0}{\partial s_3}\right)^2 \sigma_{s3}^2 \qquad (10a)$$

$$\sigma_y^2 = \left(\frac{\partial y_0}{\partial s_1}\right)^2 \sigma_{s1}^2 + \left(\frac{\partial y_0}{\partial s_2}\right)^2 \sigma_{s2}^2 + \left(\frac{\partial y_0}{\partial s_3}\right)^2 \sigma_{s3}^2 \qquad (10b)$$

$$\sigma_x^2 = \left(\frac{\partial z_0}{\partial s_1}\right)^2 \sigma_{s1}^2 + \left(\frac{\partial z_0}{\partial s_2}\right)^2 \sigma_{s2}^2 + \left(\frac{\partial z_0}{\partial s_3}\right)^2 \sigma_{s3}^2 \qquad (10c)$$

where the partial derivatives are computed at constant $R_k$. For simplicity, one can assume that the error distributions of the $s_i$ are Gaussian and that the three standard deviations are equal, i.e., $(\sigma_1 = \sigma_2 = \sigma_3 = \sigma_s)$. For a spherically-symmetric probability distribution of three-dimensional positions $r_0 = (x_0, y_0, z_0)$, the spherical error probable (SEP), which is the radius R within which 50% of the points lie, is related to the standard deviations $\sigma_x = \sigma_y = \sigma_z = \sigma$ by $R \approx 1.538 \sigma$. In this nonlimiting example, the probability distribution of $r_0$ is not necessarily spherical. To approximate the SEP error metric, one can compute a weighted approximation to the SEP metric by defining $$R_{xyz} \cong 1.538 \frac{1}{\sqrt{3}} (\sigma_x^2 + \sigma_y^2 + \sigma_z^2)^{\frac{1}{2}}.$$

When the error distribution for $x_0$ is spherically symmetrical, the error metrics are equal: $R_{xyz} = R$. Consider the effect of GDOP for two cases. In case one, the interferometer baselines are near each other. In the other case, the baselines are well separated, as in the case of classical GPS or a classical TOA system.

Geodetic Positioning System

FIG. 3 is a three-dimensional diagram of Cartesian coordinates illustrating a few possible positions for baselines 30a, 30b, and 30c, in three-dimensional space. Consider a case in which the three baselines 30a, 30b, and 30c coincide with the three Cartesian coordinate axes (x, y, z) of a reference frame. Such a case might occur when the baselines are on the Earth, and its is desired to determine the position of an object with respect to a topocentric coordinate system. For example, consider the center of the QPS at the origin of Cartesian coordinates and an object with a corner reflector at a range of 100 meters (m) from the QPS, with coordinates $$(x_0, y_0, z_0) = \frac{(100m)(1, 1, 1)}{\sqrt{3}}.$$

As shown in FIG. 3, interferometer 32a and optical delay 34a correspond with baseline 30a on the x-axis (as similarly shown in FIG. 1). Additionally, interferometer 32b and optical delay 34b are associated with baseline 30b (on the z-axis). Finally in this nonlimiting example, interferometer 32c and optical delay 34c are associated with baseline 30c on the y-axis. In operation, each baseline will communicate photons with corner cube reflector 36.

While the configuration of baselines 30a, 30b, and 30c are associated with the Cartesian coordinate system, this is but a nonlimiting example. Other configurations may be implemented which provide greater performance of the QPS. Additionally, FIG. 3 illustrates that interferometers 32a, 32b, and 32c may be centered on baselines 30a, 30b, and 30c, respectively. However, this is not a requirement.

Figure 4:
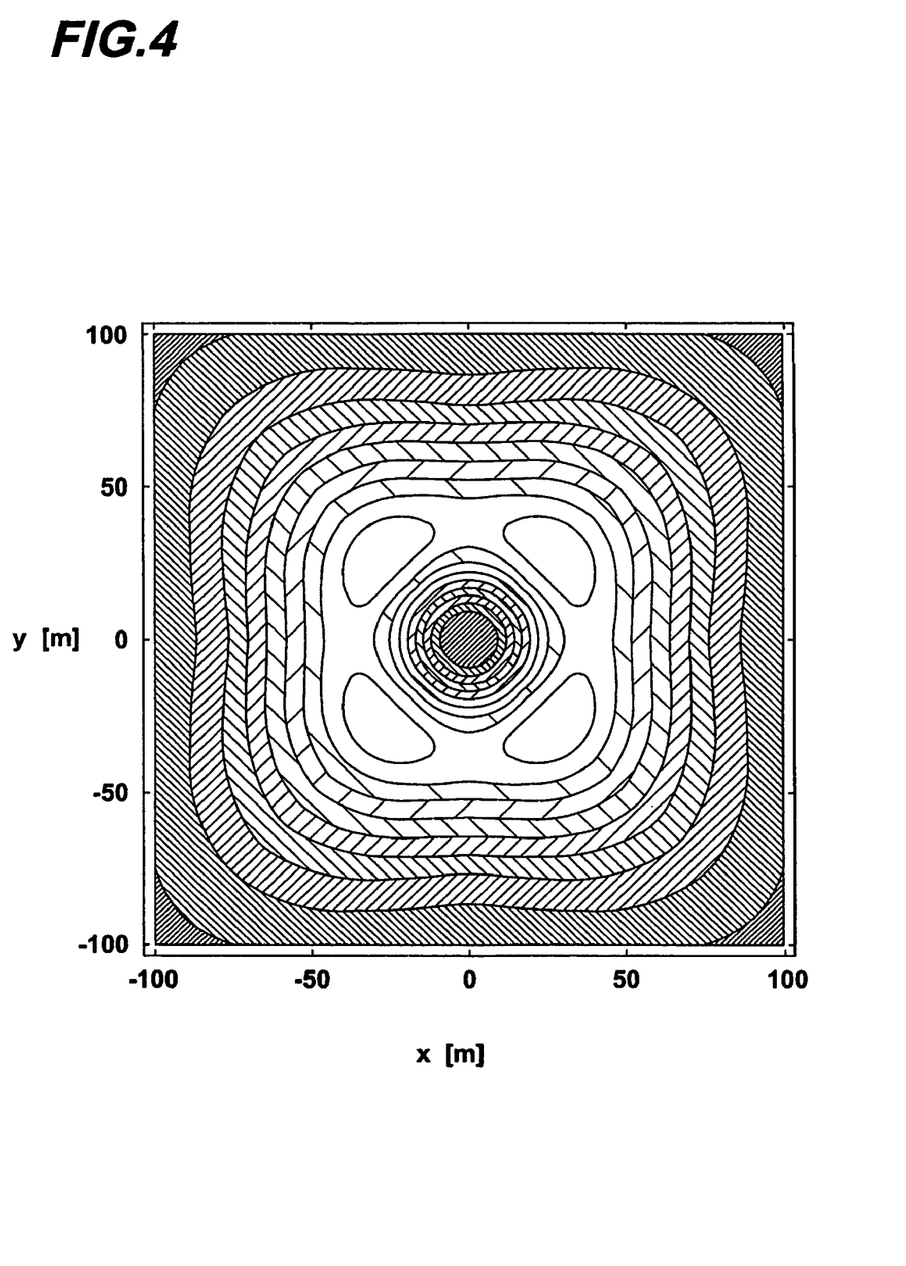
FIG. 4 is a topographical error plot illustrating errors of the QPS while in the x–y plane.

FIG. 4 is an topographical error plot illustrating the errors of the QPS while in the x-y plane. As illustrated in FIG. 4, a plot of contours of constant values of $1/R_{xyz}$ in the $x_0$-$y_0$ plane at $$z_0 = \frac{100m}{\sqrt{3}}$$

for the interferometer arm (half) length $a=2$ m and error (standard deviation) in optical path $\sigma_s = 10 \times 10^{-6}$ m. In the contour plot, the position error is $R_{xyz:} = 8.3$ cm for $$(x_0, y_0, z_0) = \frac{(100m)(1, 1, 1)}{\sqrt{3}},$$

whereas for $$(x_0, y_0, z_0) = \left(30m, 30m, \frac{100m}{\sqrt{3}}\right)$$

the error $R_{xyz}=3.9$ cm, which corresponds to the upper right high-accuracy (un-shaded) region in FIG. 4. On the z-axis at $x_0=y_0=0$ and $z_0=100$ m the error $R_{xyz}$ is essentially infinite.

Figure 5:
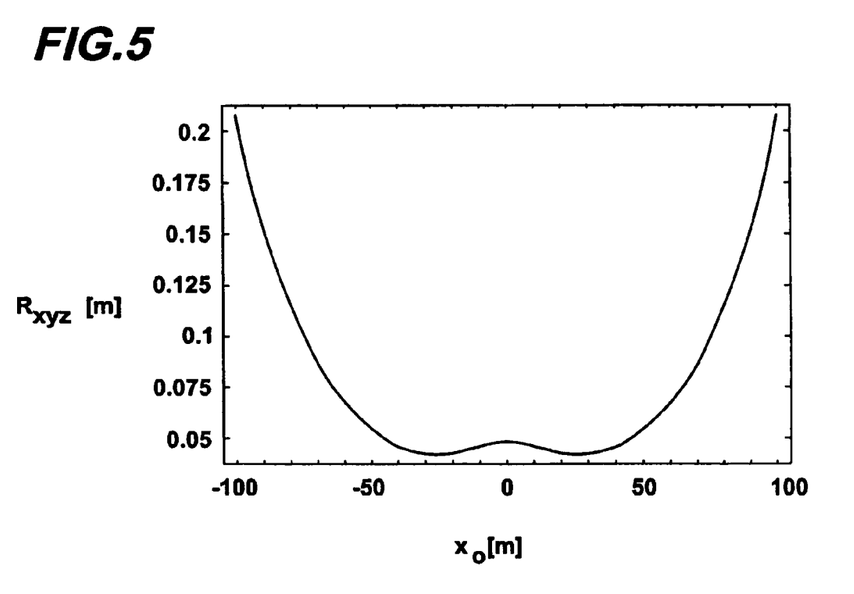
FIG. 5 is a two-dimensional plot illustrating error R as a function of position $x_0$.
Figure 6:
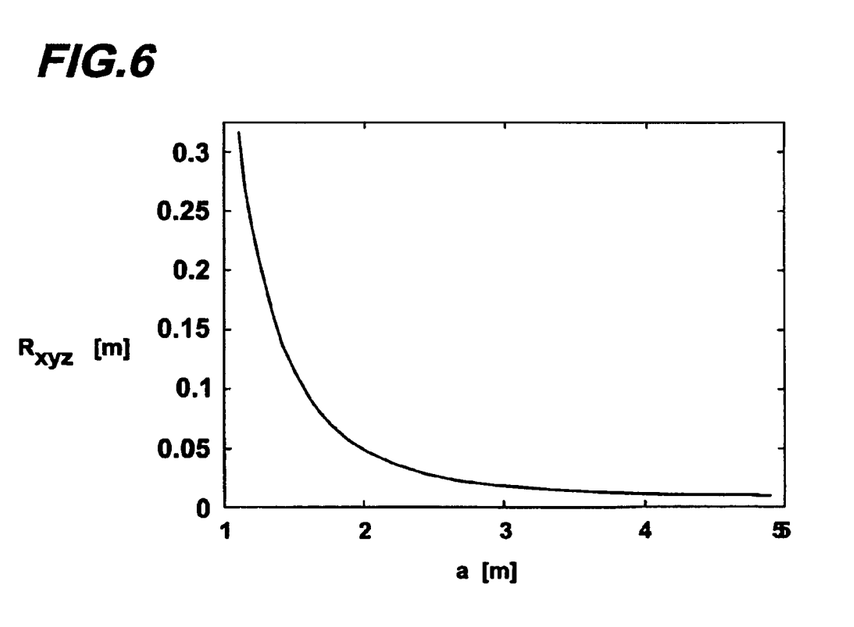
FIG. 6 is a two-dimensional plot of an error $R_{xyz}$ versus "a", where "a" is half of the interfermoeter baseline length.

FIG. 5 is a two-dimensional plot illustrating error R as a function of position $x_0$. As shown in FIG. 5, the error metric $R_{xyz}$ versus $x_0$, for $y_0=30$ m and $$z_0 = \frac{100m}{\sqrt{3}},$$

corresponds to a line in FIG. 4 with relatively small error $R_{xyz}$. In the high-accuracy light-shaded region of FIG. 4, for $x_0=y_0=30$ m and $$z_0 = \frac{100m}{\sqrt{3}},$$

the dependence of the error $R_{xyz}$ on the baseline length $2a$ is plotted in FIG. 6, also using $a_s=1.0\times10^{-6}$ m.

FIG. 6 is a 2-dimensional plot of the error $R_{xyz}$ versus a, where a is half of the interfermoeter baseline length. As shown in FIG. 5, $x_0=y_0=30$ m and $$z_0 = \frac{100m}{\sqrt{3}},$$

which corresponds to the high-accuracy light shaded region in the upper right portion of FIG. 4. As is evident, error $R_{xyz}$ decreases as a increases. Finally, as shown in FIG. 4, for a four-meter baseline, $2a=4$ m, the error is just under 5 cm.

Note that the position error $R_{xyz}$ linearly depends on $\sigma_s$, which is the standard deviation (error) in measurement of the optical path delay needed to obtain the minimum in two-photon coincidence counts $R_c$. The width of this minimum depends on the interference filters in front of the photon coincidence counting detectors as well as the pump laser bandwidth. Depending on the experimental design, this minimum may be measured to better than $a_s=1.0\times10^{-6}$ m, which was used in these plots, and hence accuracies may be better than plotted in this disclosure.

Finally, the error function $R_{xyz}$ has a very complex dependence on user coordinates $(x_0, y_0, z_0)$ and, as stated earlier, the error function $R_{xyz}$ also critically depends on the manner in which the baselines are distributed (i.e., the error depends on the six points $R_k$ for $k=1, \ldots, 6$, which define the baseline endpoints).

Satellite-Based QPS

Figure 7:
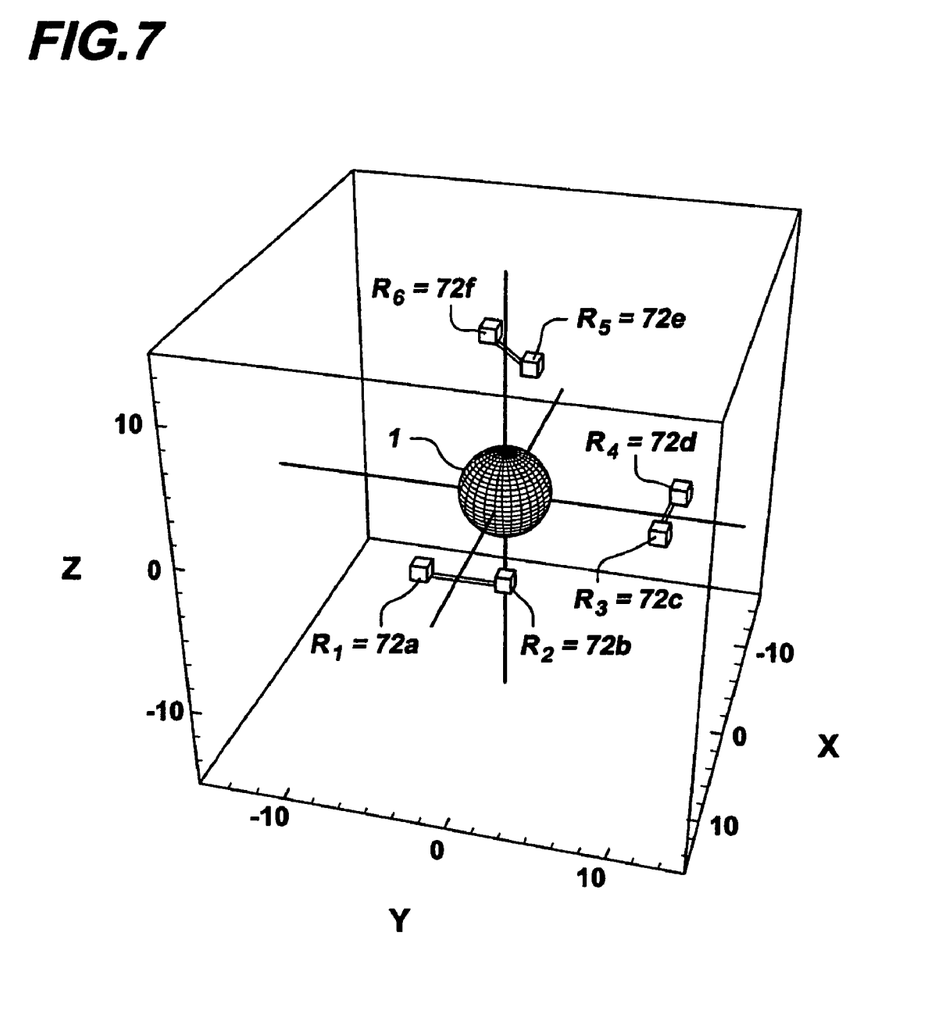
FIG. 7 is a three-dimensional block diagram representation of a satellite-based QPS.

FIG. 7 is a three-dimensional block diagram representation of a satellite-based QPS. In this a nonlimiting example, each point of a baseline, $R_i$, is associated with a different low-Earth orbit (LEO) satellite $72a$-$72f$, located at a distance from Earth 1. In addition, the spatial interferometer legs are formed from pairs of points $(R_1, R_{-2})$, $(R_3, R_4)$, and $(R_5, R_6)$, which correspond to the three baselines $30a$, $30b$, and $30c$, from FIGS. 1 and 3.

As an example of the positioning errors in a QPS made from LEO satellites, one can take the baseline endpoints to be: $R_1=(a, -b/2, 0)$, $R_2=(a, b/2, 0)$, $R_3=(b/2, a, 0)$, $R_4=(-b/2, a, 0)$, $$R_5 = \left(\frac{-b}{2\sqrt{2}}, \frac{-b}{2\sqrt{2}}, a\right) \text{ and } R_6 = \left(\frac{b}{2\sqrt{2}}, \frac{b}{2\sqrt{2}}, a\right).$$

A plot of this configuration is shown in FIG. 7, which is a nonlimiting example of possible satellite positions used to locate a user. As is evident in this nonlimiting example, the satellites' positioning are dynamic and such a system will not maintain static coordinates. For full coverage of the Earth 1, additional satellites may be implemented. Additionally, although FIG. 7 illustrates a LEO system where the baselines are formed with three pairs of satellites, this is but one nonlimiting example. In another nonlimiting example, the corner cube reflector may be part of a satellite, and the user possesses at least one baseline. In such a system, the user may possess one baseline, which is incorporated into a handheld device. The other baselines may be located at various other positions, or even within the same device as the first baseline. In this situation, similar principles are applied, except the corner cube reflector may be part of a satellite, or at another position to determine the desired coordinates. As an alternative embodiment, a single satellite may incorporate a baseline, thus reducing the number of satellites utilized. Depending on the particular implementation the user desires, different embodiments may be implemented.

Figure 8:
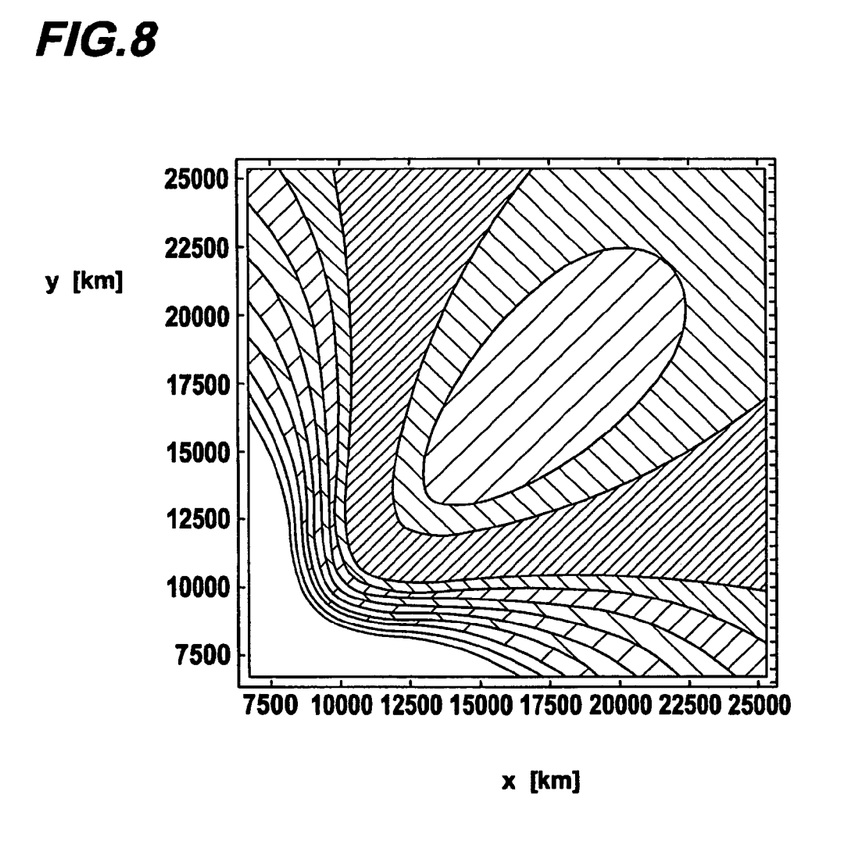
FIG. 8 is a contour plot of the reciprocal error function, $1/R_{xyz}$, shown in the $x_0$–$y_0$ plane for $z_0=R_e\sqrt{3}$, where $R_e$=6378 km is the Earth's radius.

FIG. 8 is a contour plot of the reciprocal error function, $1/R_{xyz}$, shown in the $x_0$-$y_0$ plane for $z_0=R_e\sqrt{3}$, where $R_e=6378$ km is the Earth's radius. As an example, the calculations below take the semi-major axis of the LEO satellites to be $a=7360$ km and the baseline between pairs of satellites as $b=20$ km. The standard deviation (error) in the measured optical delay is taken to be $a_s=1.0$ micrometers. For a user on the surface of the Earth with coordinates $$(x_0, y_0, z_0) = \frac{(1, 1, 1)R_e}{\sqrt{3}}$$

the error is $R_{xyz}=0.10$ cm.

Figure 9:
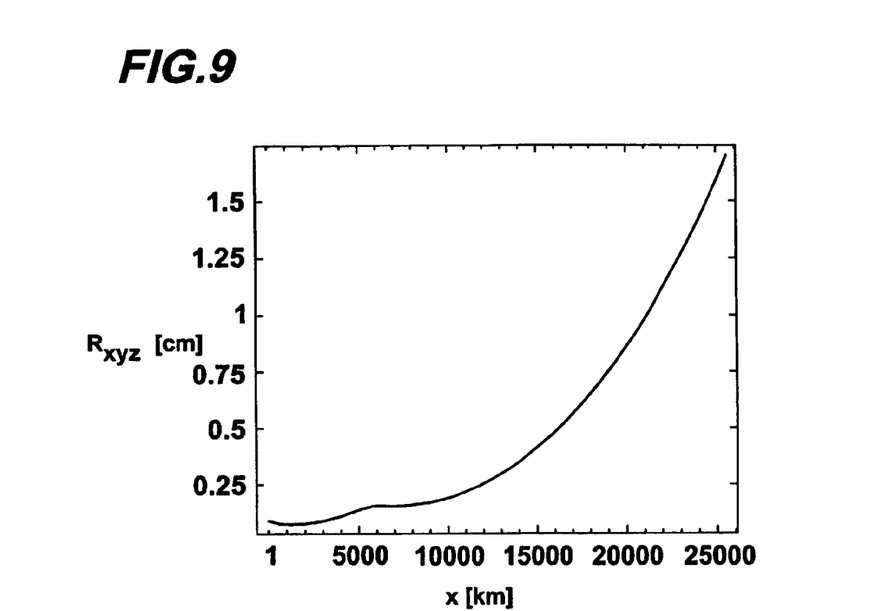

FIG. 9 is a 2-dimensional plot illustrating the position error $R_{xyz}$ versus $x_0$ for $$y_0 = z_0 = \frac{R_e}{\sqrt{3}}$$

in at least one embodiment of a QPS. Note that over a large range of $x_0$-values the error remains below 1 cm.

Figure 10:
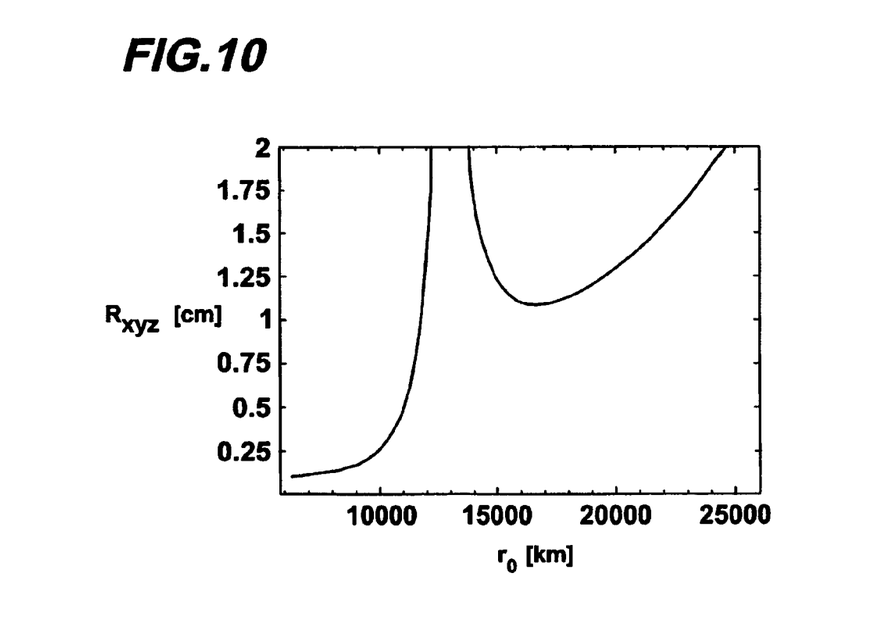

Finally, FIG. 10 illustrates a plot of the position error in the radial direction: $R_{xyz}$ $$\left(\frac{r_0}{\sqrt{3}}, \frac{r_0}{\sqrt{3}}, \frac{r_0}{\sqrt{3}}\right)$$

versus $r_0$ for the same parameters. On a radial line in the (1, 1, 1) direction, the error remains below 1 cm up to $r_0$=11680 km. However, near 1300 km the error rises steeply. This is a nonlimiting example of the complex dependence of $R_{xyz}$ on user position, which was mentioned earlier.

Clearly, the geometric positioning and layout of the baselines significantly affects the accuracy of a user's position. Note that the terrestrial QPS discussed in the previous section had a ratio of baseline length to user position $$\frac{a}{r_0} = 0.02,$$

whereas this LEO satellite QPS has b/a=0.003. By comparing the baseline layout for the terrestrial QPS and this LEO satellite QPS, it is clear that the positioning accuracy is sensitive to the separation and layout of the baselines, but not so sensitive to the baseline lengths.

The above calculations for a satellite-based QPS are only meant to illustrate the magnitude of errors in position that may be achievable. Further, satellites could be created using any of a variety of methods, including the Kalman filtering techniques. The calculations above suggest that if properly engineered, a satellite-based QPS may achieve position accuracy of objects near the Earth's surface below 1 cm. In these calculations, atmospheric time delays are ignored. However, corrections can be made for atmospheric effects using multiple colors of photons. Perhaps one advantage of the quantum system as compared to the classical GPS is that entangled photons exhibit group velocity dispersion cancellation, which may be an important factor for future engineering and design of a QPS.

Position-Only Determination

A QPS can be designed to work in several modes, depending on the desires of the user and the required scenario. While the above discussion described a case in which a user of the QPS wants to determine both his spatial and time coordinates, ($t_0$, $x_0$, $y_0$, $z_0$), a second alternative may be that a user only desires to obtain his or her spatial coordinates, and may not need a time measurement. In this latter case, the time synchronization portion of the system is unnecessary, and the user may find his or her position coordinates ($x_0$, $y_0$, $z_0$) by having only a corner reflector and a one-way (reception only), classical channel of communication with the reference frame origin, in which the simultaneity of the three two-photon coincidence counting rate minima is established.

Another mode of operation of a QPS can be used to determine the position of an object such as a geostationary satellite with a corner cube reflector. The satellite's position coordinates can be determined on the ground using a QPS and a corner cube reflector (similar to item 36, FIG. 1) without the use of a communication channel or an on-board clock. The user of a geostationary satellite enables a simplification of calculations compared to a satellite system without geostationary satellites. However, that benefit may be balanced with loss of accuracy for users at certain points on Earth.

User Carries QPS Receiver

The scenarios that are described above entail measurements such as adjusting the optical delays (34a, 34b, 34c (FIGS. 1, 3) and the calculations such as to computing $r_0$ that are computed near the origin of the reference frame. In a classical GPS receiver, these quantities are computed locally in the user's GPS receiver. In one embodiment of the present disclosure, the QPS analog of this classical GPS scenario is a setup where the biphotons are generated at points $E_1$, $E_2$, and $E_3$, but the user carries at least one beam splitter (44, see FIG. 2) and at least one photon detector (48q, 48, see FIG. 2). In this scenario, the user controls and may also carry at least one of the optical delays (34a, 34b, 34c).

Additionally, the user is able to locally measure the optical delays, $s_1$, $s_2$, and $s_3$. The user may receive a classical message including the coordinates of baseline endpoints, $R_i$, i=1, ... 6, and then he can solve the Equations (4)-(6) for his position $r_0$=($x_0$, $y_0$, $z_0$). In such a case, there are no clocks on board the broadcasting satellites, located at positions $R_i$. However, the user may carry a clock with short term stability to determine rate of photon coincidence counts from each of the three baselines 30a, 30b, 30c (FIGS. 1, 3) and also he may engage coincidence counting for time determination, if time is needed. For the three spatial baselines 30a, 30b, 30c, optical propagation is then a one-way communication from satellites to QPS user receiver, using the satellite positions as a primary reference system. For time synchronization, as mentioned previously, the optical propagation is typically in the form of two-way communication, when using the method of Bahder and Golding. The QPS receiver may be a handheld user device, and may include a beam splitter 44 (FIG. 2), two single-photon detectors 48p, 48q and a controllable optical delay for each of the four channels. All four space-time coordinates can be obtained by a user in this way. One clock in the reference frame can have long-term stability to define coordinate time, and another clock in the QPS user receiver can have short-term stability. Note that the satellites do not need to carry clocks, because their positions can be used to define the primary system of coordinates.

QPS Space-Time Coordinates

The satellites at baseline points $R_i$ can be taken to define the primary system of reference, even though the points $R_i$ change with time. The quantities measured by a user of such a QPS are then ($s_0$, $s_1$, $s_2$, $s_3$), where so is the optical time delay (in the HOM interferometer) that will provide the user with coordinate time in this coordinate system (possibly using the Bahder and Golding method), and ($s_1$, $s_2$, $s_3$) are the three optical delays in the three interferometers for position determination. The quantities ($s_0$, $s_1$, $s_2$, $s_3$) are then to be regarded as generalized 4-dimensional space-time coordinates, $s_0$ is a time-like coordinate and ($s_1$, $s_2$, $s_3$) are space-like coordinates. Within the context of general relativity these coordinates enter into the metric $c^2 d\tau^2 = g_{ij} ds_i ds_j$ of the flat space-time assumed in this disclosure. Of course, a transformation from the QPS space-time coordinates, ($s_0$, $s_1$, $s_2$, $s_3$), to an Earth-centered inertial (ECI) system of coordinates, say (t, x, y, z), is of interest for astrodynamic applications. Such a transformation can be completed approximately by conventional means of tracking the satellites at baseline points $R_i$.

It is interesting to remark that the QPS allows the direct measurement of four-dimensional space-time coordinates. Previously, it was believed that space-time coordinates were not measurable quantities. Of course, the QPS coordinates ($s_0$, $s_1$, $s_2$, $s_3$) are real physical measurements, and real measurements are space-time invariants under generalized coordinate transformations.

In practice, any of a number of embodiments can be implemented. As a nonlimiting example, in one embodiment of a short range terrestrial QPS, the user may possess the corner cube reflector 36 (FIG. 1), and the baselines 30a, 30b, 30c may be located at various positions, and may be placed by the user. In such a situation, the baselines may defined by rods of similar or varying lengths. Each of the rods may also include an interferometer 32a, 32b, 32c and a plurality of reflectors to reflect the photons back to the corner cube reflector 36.

In an alternative embodiment, the QPS may be satellite based 72a-f, and the baselines 30a, 30b, 30c may be defined by pairs of satellites. In such system, the interferometers 32a, 32b, 32c may be located in either one of the satellite pairs. Additionally, because the positions of the satellites are dynamic, the coordinate systems implemented may also be dynamic (see FIG. 7).

In another alternative embodiment, the QPS may include a corner cube reflector that is located remotely from the user. In such a system, the user may possess a handheld device, or other instrument that includes a baseline and interferometer. The other baselines may be positioned at remote locations from the user, and can be situated to communicate the photon pairs with the corner cube reflector. The corner cube reflector in this embodiment may be part of a satellite system or may be part of a short or long-range terrestrial system.

It should be emphasized that many variations and modifications may be made to the above-described embodiments. All such modifications and variations are intended to be included herein within the scope of this disclosure and protected by the following claims. The present disclosure is not intended to be limited to any one embodiment, or merely to the embodiments described herein.

The invention claimed is:

1. A method for determining a user's position, comprising:
    creating at least one bi-photon pair in an interferometer positioned along a baseline position;
    directing the photons of the at least one bi-photon pair in opposite directions along the baseline;
    redirecting the photons of the at least one bi-photon pair moving along the baseline to a corner cube reflector;
    receiving the photons of the at least one redirected bi-photon pair from the corner cube reflector; and
    determining a difference in arrival times of the photons of the at least one redirected bi-photon pair at the interferometer as an indication of a user position.

2. The method of claim 1, further comprising generating an optical delay on at least one photon in the at least one bi-photon pair.

3. The method of claim 1, wherein the step of creating the at least one bi-photon pair comprises utilizing an HOM interferometer to generate the bi-photon pair.

4. The method of claim 1, wherein creating at least one bi-photon pair in an interferometer includes creating 3 photon pairs, each photon pair created in a different interferometer positioned along a different baseline.

5. The method of claim 1, wherein receiving each photon of the at least one redirected bi-photon pair from the corner cube reflector includes receiving the at least one bi-photon pair in a user handheld device.

6. The method of claim 1, wherein the user is positioned proximate the corner cube.

7. The method of claim 1, wherein the user is positioned at a point along the baseline proximate the interferometer.

8. A quantum positioning system comprising:
    a baseline having a first end and a second end;
    a corner cube reflector capable of redirecting an incoming photon in an opposite direction to an incident direction of the photon;
    means at said baseline for generating a pair of photons moving in opposite directions along said baseline to said first and second ends;
    means at said first end for redirecting an incoming photon along said baseline to said corner cube reflector and redirecting an incoming photon from said corner cube reflector back along said baseline;
    means at said second end for redirecting an incoming photon along said baseline to said corner cube reflector and redirecting an incoming photon from said corner cube reflector back along said baseline;
    and photon detection means at said baseline responsive to the return of said photons for determining a coordinate position on said baseline as a function of a difference in arrival times of said photons.

9. The quantum positioning system of claim 8 wherein said means at said baseline for generating a pair of photons simultaneously generates an entangled photon pair.

10. The quantum positioning system of claim 8 wherein said detection means includes an adjustable optical delay means for nulling a difference in arrival times of the pair of photons as an indication of the coordinate position on said baseline.

11. The quantum positioning system of claim 8 wherein said corner cube reflector is positioned on a satellite.

12. The quantum positioning system of claim 8 wherein said means at said first end for redirecting an incoming photon along said baseline to said corner cube reflector and redirecting an incoming photon from said corner cube reflector back along said baseline comprises an optical reflecting means.

13. The quantum positioning system of claim 8 further including:
    a second baseline having a first end and a second end;
    means at said second baseline for generating a second pair of photons moving in opposite directions along said second baseline to said first and second ends;
    means at said first end of said second baseline for redirecting an incoming photon along said second baseline to said corner cube reflector and redirecting an incoming photon from said corner cube reflector back along said second baseline;
    means at said second end of said second baseline for redirecting an incoming photon along said second baseline to said corner cube reflector and redirecting an incoming photon from said corner cube reflector back along said second baseline;
    and photon detection means at said second baseline responsive to the return of said second pair of photons for determining a coordinate position on said second baseline as a function of a difference in arrival times of said second pair of photons.

* * * * *